United States Patent [19]

White et al.

[11] Patent Number: 5,976,283
[45] Date of Patent: *Nov. 2, 1999

[54] RESIDUE WAX COATED NITRATE SALT

[75] Inventors: Barton White, Montreal, Canada; Kenneth Clive Ramsey, Bernardsville, N.J.

[73] Assignee: Canbro Inc., Valleyfield, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,267

[22] Filed: Oct. 29, 1997

Related U.S. Application Data

[63] Continuation of application No. 08/677,614, Jul. 8, 1996, abandoned.

[30] Foreign Application Priority Data

Jul. 7, 1995 [IE] Ireland ..................................... 950517

[51] Int. Cl.⁶ .................................................... C06B 45/32
[52] U.S. Cl. ............................... 149/7; 149/46; 149/109.6
[58] Field of Search ................................ 149/7, 109.6, 46

[56] References Cited

U.S. PATENT DOCUMENTS

| | | | |
|---|---|---|---|
| 2,345,582 | 4/1944 | Carey | 149/7 |
| 3,156,186 | 11/1964 | Picciano | 102/28 |
| 3,287,189 | 11/1966 | Wilson et al. | 149/7 |
| 3,303,073 | 2/1967 | Graham et al. | 149/7 |
| 3,640,784 | 2/1972 | Yancik et al. | 149/43 |
| 3,834,955 | 9/1974 | Fox et al. | 149/7 |
| 3,930,911 | 1/1976 | Clark | 149/46 |
| 4,367,103 | 1/1983 | Enever | 149/7 |
| 4,430,132 | 2/1984 | Painter | 149/109.6 |
| 4,933,029 | 6/1990 | Sheeran | 149/7 |
| 5,396,405 | 3/1995 | Smith et al. | 149/46 |
| 5,454,889 | 10/1995 | McNicol et al. | 149/7 |

FOREIGN PATENT DOCUMENTS

| | | |
|---|---|---|
| 0015725 | 9/1980 | European Pat. Off. . |
| 1264584 | 2/1972 | United Kingdom . |

OTHER PUBLICATIONS

6001 Chemical Abstracts 114, "Coating of fertilizers for caking prevention", No. 3, Jan. 21, 1991.
6001 Chemical Abstracts utr., vol. 93, p 575, Sep. 13, 1980.

*Primary Examiner*—Edward A. Miller
*Attorney, Agent, or Firm*—Jacobson, Price, Holman & Stern, PLLC

[57] ABSTRACT

Solvent is extracted by distillation from a residue filtrate generated in producing aluminium paste by filtering a slurry of aluminium particles, at least one fatty acid and a solvent. The distillation produces a residue wax. The wax is used to form a coating composition for coating onto prills of ammonium nitrate to provide at least a part substitute or replacement for conventional fuel oil coatings, especially for use in commercial explosives.

19 Claims, No Drawings

RESIDUE WAX COATED NITRATE SALT

This is a continuation of application Ser. No. 08/677,614, filed Jul. 8, 1996 which was abandoned upon the filing hereof.

The invention relates to a composition of a nitrate salt and a waste product for use primarily, but not exclusively, as a commercial explosive.

INTRODUCTION

A widely used commercial explosive is a combination of ammonium nitrate and fuel oil in a typical weight ratio of 94:6. Such explosives are commonly referred to as ANFO. Ammonium nitrate and other nitrate salts are also used as fertilisers, depending on the density of the nitrate.

U.S. Pat. No. 3,156,186 describes an explosive composition comprising flaked aluminium and ammonium nitrate. The explosive is initiated with an exploding bridgewire device.

U.S. Pat. No. 3,640,784 describes a complex blasting composition containing defined amounts of: ammonium nitrate, a solid densifying agent, a self complexing guar gum, glycerine or ethylene glycol, a metallic sensitizer, a water resistant agent and an oxide or hydroxide temperature stabiliser.

U.S. Pat. No. 3,930,911 describes an ANFO-based non-emulsifiable blasting composition which includes an oil-soluble organic acid and ammonia which are said to reduce caking and liquid phase separation.

U.S. Pat. No. 4,933,029 describes a water resistant ANFO based explosive composition. The water resistance is provided by a coating of a hydrophillic cold-water swellable thickener (e.g. guar gum) and a hydrophobic water-repelling compound.

U.S. Pat. No. 5,397,405 describes an ANFO type explosive composition comprising defined amounts of waste oil, ammonium nitrate and lignite.

FR-A-1,370,801 describes the mixing of ammonium nitrate with a paste made up of a colloidal fatty substance and a pulverent product such as a metallic powder or charcoal.

Chem. Abs. Vol. 93 No. 13 Abst. No. 131,416 refers to anticaking agents used in fertiliser manufacture. The anticaking agent mentioned contains 90% free fatty acids dissolved in kerosine or naphtha.

Chem. Abs. Vol. 114 No. 3 Abst. No. 230,286 refers to an anticaking coating solution for fertilisers comprising a fatty acid and a fatty amine in a petroleum hydrocarbon solvent.

GB-A-1,264,584 relates to the production of metallic flaked powders.

EP-A-15,725 describes the production of non-leafing aluminium flake pigment.

STATEMENTS OF INVENTION

According to the invention there is provided an explosive or fertiliser composition comprising:
 at least one nitrate salt; and
 a coating on the nitrate salt,
wherein
 the coating comprises the residue wax formed on extracting solvent from a residue filtrate generated in producing aluminium paste by filtering a slurry of aluminium particles, at least one fatty acid and a solvent.

In one embodiment Of the invention, the residue wax is a stills bottoms residue formed on distilling the residue filtrate to remove some of the solvent.

In another aspect, the invention provides the use of a residue waste by product formed in aluminium paste production as a coating for a nitrate salt, the coating comprising the residue wax formed an extracting solvent from a residue filtrate generated in producing aluminium paste by filtering a slurry of aluminium particles, at least one fatty acid and a solvent.

In one embodiment of this aspect of the invention, the residue wax is a stills bottoms residue wax formed on distilling the residue filtrate to remove some of the solvent.

In a further aspect, the invention provides a method of coating a nitrate salt comprising the steps of:
 filtering a slurry of aluminium particles, at least one fatty acid, and a solvent to extract aluminium paste and forming a residue filtrate;
 extracting solvent from the residue filtrate leaving a residue wax; and
 coating nitrate salt with the residue wax.

In one embodiment of this aspect of the invention, this solvent is extracted from the residue filtrate by distilling the residue, filtrate to remove some of the solvent leaving a stills bottom wax.

In another aspect, the invention provides a method of using a residue wax by product formed in aluminium paste production comprising the step of coating a nitrate salt with a coating comprising the residue wax formed on extracting solvent from a residue filtrate generated in producing aluminium paste by filtering a slurry of aluminium particles, at least one fatty acid and a solvent.

In one embodiment of this aspect of the invention, the solvent is extracted by distilling the residue filtrate to remove some of the solvent leaving a stills bottom residue filtrate wax.

In one embodiment of the invention, the solvent is an aromatic or aliphatic solvent, especially mineral spirits.

In one embodiment of the invention of the mineral spirits is present in an amount of from 20% to 70% by weight of the residue wax, typically in an amount of from 40% to 60% by weight of the residue wax.

Preferably, the fatty acid is stearic acid, isostearic acid or oleic acid. Usually, the fatty acid is present in the residue filtrate in an amount of from 5% to 40% by weight of the residue, typically in an amount from 30% to 60% by weight of the residue wax.

Preferably, aluminium is present in an amount of from 0% to 10%, typically from 0% to 5% by weight of the residue wax.

Ideally, particularly for explosive applications, the nitrate salt is ammonium nitrate.

The nitrate salt may be in the form of granules, powder or most preferably prills.

In a particularly preferred embodiment of the invention, the composition is an explosive composition.

In another embodiment of the invention, the composition is a fertiliser composition.

The composition may include additional fuel oil such as a light mineral fuel, for example, diesel oil. The additional fuel oil may be present in an amount of from 0 to 50% by weight of the residue wax, typically in an amount of front 10% to 30%.

To produce a composition of the invention, the residue wax may be coated onto the nitrate salt.

In one embodiment of this aspect of the invention, the residue filtrate is distilled to extract solvent and to form a stills bottoms residue wax.

Typically, the flax is heated prior to coating onto the nitrate salt.

The invention is based on the use of a by product from aluminium pigment production which is currently disposed of as an at least partial substitute for fuel oil in ANFO compositions.

To produce aluminium pigments, aluminium foil is usually milled in a ball mill with mineral spirits and a fatty acid which is usually stearic acid or isostearic acid to form a slurry. The slurry is filtered using a filter press to form a filter cake containing the desired aluminium paste and a residue filtrate which usually contains mineral spirits, fatty acid and some particles of aluminium.

The residue filtrate is distilled in a distillation column to provide substantially pure mineral spirits which may be recycled to the pigment production process, and a residue. The residue is a wax at ambient temperature. The wax contains mineral spirits, stearic or isostearic acid and usually some aluminium particles.

The wax is heated to form a liquid which is coated onto a nitrate salt, typically prills of ammonium nitrate as at least a part substitute or replacement for conventional fuel oil.

The composition provides a use for a by product which would otherwise require disposal. In addition, there is the considerable advantage that the by product is hydrophobic. On coating of nitrate salts such as prills of ammonium nitrate, it forms a crystalline barrier providing good water resistance.

EXAMPLE

Aluminium in the form of aluminium foil is charged into a ball mill and mineral spirits and a fatty acid milling agent such as stearic acid are added to the mill. After milling, the slurry thus formed may be passed through a sieve to remove oversize particles which may be recycled to the ball mill. The screened and milled slurry is then filtered by passing it through a filter press to form a filter cake containing desired aluminium paste and a waste filtrate residue.

The waste filtrate residue has a typical composition of:

|  | % by weight |
| --- | --- |
| mineral spirits | 80–99.5, typically min 99 |
| stearic acid | 0.5–20, typically <1 |
| aluminium particles | 0–5, typically <1 |

Some of the white spirits is recovered by distilling the filtrate residue in a distillation column. The filtrate is heated in the column. The typical run times for the distillation of the solvent to yield a distillate of substantially pure solvent is 7 to 8 hours. The inlet flow of distillate begins at 700–800 l/hour. As you distil a residue wax builds up which decreases the flow due to poor heat transfer. When the flow decreases to 200 l/hour the residue wax is collected. The recovered mineral spirits is typically recycled to the ball mill. The stills bottom residue is in the form of a wax at ambient temperature and typically has the following composition:

|  | % by weight |
| --- | --- |
| mineral spirits | 40–60, typically 43 to 50 |
| stearic acid | 40–60, typically 48 to 55 |
| aluminum particles | 0–5 |

When required for use, the residue wax is melted at a temperature of from 60° C. to 75° C. to form a liquid. The liquid is then sprayed onto prills of ammonium nitrate using an auger mixer to form an ANFO type explosive composition.

It is well known in the explosives industry that conventional ANFO does not exhibit any water resistance.

An AN product coated with liquefied wax as described above containing 1–2% aluminium and an AN product coated with a liquid wax as described above but excluding aluminium were tested. Using a one liter vessel of water with 200 g of AN prills the dissolution of the products were tested.

|  | Time (min.) | | | | | | | | |
| --- | --- | --- | --- | --- | --- | --- | --- | --- | --- |
|  | 0 | 0.5 | 1 | 2 | 4 | 5 | 8 | 10 | 12 |
| Conductance mS/cm (with aluminum) | 0 | 0.1 | 0.4 | 1.2 | 3.8 | 4.5 | 6.2 | 6.5 | 7.0 |
| Conductance mS/cm (no aluminum) | 0 | 0.1 | 0.4 | 0.9 | 3.2 | 3.8 | 5.8 | 6.3 | 6.8 |

The AN coated samples of the invention do, however, exhibit water stability. Conventional ANFO would yield a linear relationship between conductance and time, thus indicating no water resistance in the products. In the AN coated with liquified wax (with or without aluminum), as described in the invention, the same conductance v. time relationship yields and asymptotic curve, indicating a degree of water resistance in the products. It was observed that while there was some surface dissolution, this dissolution did not penetrate through the particles.

The salt may be in the form of a prill (size range: 1.5 mm to 2.5 mm), powder (less than 1.2 mm), or in the form of granules (up to 5 mm).

The liquified residue may be sprayed onto the aluminium nitrate either alone or in combination with up to 80% by weight of a fuel oil, especially a light mineral oil such as diesel oil.

It will be appreciated that the composition of the invention many be used as a fertiliser composition.

It will also be appreciated that any suitable nitrate salt may be used.

The solvent used in the aluminium processing is usually mineral spirits, however, it may be possible to use other solvents such as naphtha.

It will also be appreciated that any suitable fatty acid may be used.

These and many other variations and modifications of the invention will be readily apparent and accordingly the invention is not limited to the embodiments hereinbefore described which away be varied in detail.

We claim:

1. A method for coating a nitrate salt comprising the steps of:
    milling aluminum with a solvent to form a slurry;
    filtering the slurry to form an aluminum paste and a residue filtrate;
    distilling the residue filtrate to extract solvent and form a stills bottom residue wax;
    coating a nitrate salt with the residue wax.

2. The method of claim 1, wherein the residue wax coating the nitrate salt comprises a solvent, at least one fatty acid and aluminum particles.

3. The method of claim 2, wherein the amount of fatty acid present in the residue wax is from 5 to 80% by weight of the residue wax.

4. The method of claim 2, wherein the amount of fatty acid present in the residue wax is from 40–60% by weight of the residue wax.

5. The method of claim 1, wherein the amount of aluminum present in the residue wax is no more than 10% by weight of the residue wax.

6. The method of claim 1, wherein the solvent is selected from the group consisting of aromatic and aliphatic solvent.

7. The method of claim 1, wherein the solvent in the residue wax is mineral spirits in an amount between 20–70% by weight of the residue wax.

8. The method of claim 1, wherein the solvent in the residue wax is mineral spirits in an amount between 40–60% by weight of the residue wax.

9. The method of claim 1, wherein the fatty acid is selected from the group consisting of stearic, isostearic and oleic.

10. The method of claim 1, wherein the residue wax is a liquid at between 60–75° C.

11. The method of claim 1, wherein the residue wax comprises aluminum particles present in an amount from 0–10% by weight of the residue wax.

12. The method of claim 10 wherein the aluminum particles are present in an amount from 0–5% by weight of the residue wax.

13. The method of claim 1, wherein the nitrate salt is an ammonium nitrate salt.

14. The method of claim 1, wherein the nitrate salt is in a form selected from the group consisting of granules; powders and pills.

15. The method of claim 1, further comprising adding a fuel oil to the coated nitrate salt.

16. The method of claim 15, wherein the fuel oil is selected from the group consisting of light mineral oil and diesel oil.

17. The method of claim 15, wherein fuel oil is added in an amount from 10–30% by weight of the residue wax.

18. The method of claim 1, wherein fuel oil is added to the coated nitrate salt in an amount from 0–80% by weight of the residue wax.

19. An explosive composition comprising a nitrate salt coated with a stills bottom residue wax, wherein the coated nitrate salt is obtained by milling aluminum with a solvent to form a slurry;

filtering the slurry to form an aluminum paste and a residue filtrate;

distilling the residue filtrate to extract solvent and forming a stills bottom residue wax; and coating a nitrate salt with the residue wax.

\* \* \* \* \*